Oct. 31, 1967
K. BROOKS
3,349,560
GAS TURBINE BY-PASS JET ENGINE
Filed Oct. 8, 1965
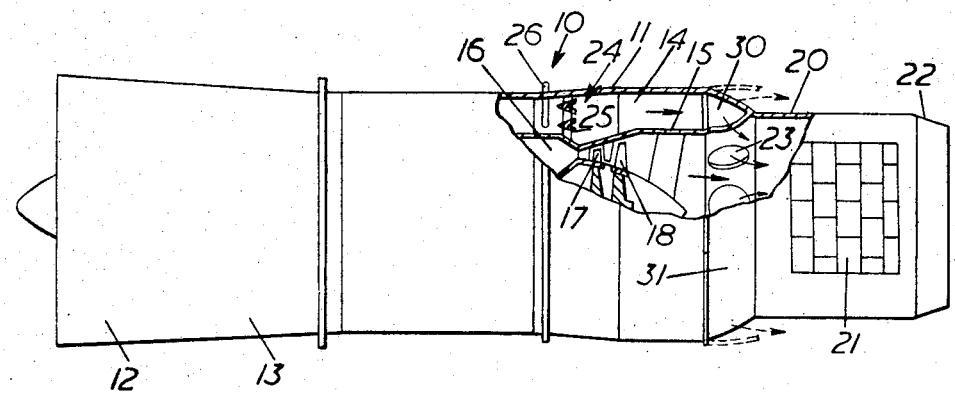
Inventor
Kenneth Brooks
By
Cushman, Darby & Cushman
Attorneys

United States Patent Office 3,349,560
Patented Oct. 31, 1967

3,349,560
GAS TURBINE BY-PASS JET ENGINE
Kenneth Brooks, Derby, England, assignor to Rolls-Royce Limited, Derby, England, a British company
Filed Oct. 8, 1965, Ser. No. 494,200
Claims priority, application Great Britain, Nov. 11, 1964, 46,052/64
2 Claims. (Cl. 60—224)

ABSTRACT OF THE DISCLOSURE

A gas turbine by-pass jet engine having a main flow duct terminating in a jet pipe, a by-pass duct, having combustion equipment therein, terminating in a by-pass nozzle which is provided with flaps, the flaps being opened to direct by-pass air to atmosphere when the by-pass combustion equipment is operative, and the flaps being closed when the by-pass combustion equipment is inoperative, the jet pipe and the by-pass duct being in permanent communication with each other.

---

This invention concerns a gas turbine by-pass jet engine.

According to the present invention, there is provided a gas turbine by-pass jet engine having a by-pass passage which is arranged to receive by-pass air, a jet pipe terminating in a jet nozzle with which the by-pass passage communicates, combustion equipment mounted in the by-pass passage upstream of the region in which the latter communicates with the jet pipe, a by-pass nozzle which is mounted at the downstream end of the by-pass passage, valve means provided at the downstream end of said by-pass nozzle through which by-pass air may be directed to atmosphere, means for supplying fuel to the said combustion equipment, and means for opening said valve means to permit flow through said by-pass nozzle when said combustion equipment is operative, and means for closing said valve means to prevent flow through said by-pass nozzle when said combustion equipment in inoperative.

The jet pipe is preferably provided with a plurality of angularly spaced apart apertures through which the downstream end of the by-pass passage permanently communicates with the jet pipe.

If desired the jet pipe may be provided with a thrust reverser.

The invention is illustrated, merely by way of example, in the accompanying drawing, which is a diagrammatic elevation, partly in section, of a gas turbine by-pass jet engine according to the present invention.

Referring to the drawing, a gas turbine by-pass jet engine 10 has an outer casing 11 in the upstream end of which there is mounted a low pressure compressor 12. The engine 10 has a high pressure compressor 13 which receives part of the air compressed by the low pressure compressor 12, the other part of the air compressed by the low pressure compressor 12 being supplied to the upstream end of a by-pass passage 14 which is defined between the outer casing 11 and an inner casing 15.

The air compressed by the high pressure compressor 13 passes via main combustion equipment 16 to drive a high pressure turbine 17 and a low pressure turbine 18, the turbines 17, 18 respectively driving the compressors 13, 12.

The turbine exhaust gases are directed to atmosphere through a jet pipe 20 which is provided with a thrust reverser 21 and whose downstream end is provided with a variable area nozzle 22.

The downstream end of the by-pass passage 14 is in permanent communication with the jet pipe 20 via a plurality of angularly spaced apart apertures 23 formed in the jet pipe 20.

Combustion equipment 24, which is constituted by a pair of radially spaced apart concentrically arranged annular V-section gutters 25, is mounted in the by-pass passage 14 substantially upstream of the region in which the latter communicates with the jet pipe 20. Fuel is supplied to the combustion equipment 24 from a fuel manifold 26.

The downstream end of the by-pass passage 14 is provided with an annular nozzle 30 through which the by-pass air may be directed to atmosphere. The nozzle 30 is provided with a set of flap members 31 which may be moved (by means not shown) between the full line position shown, in which they prevent flow through the nozzle 30, and the dotted line position shown, in which they permit such flow.

During cruising conditions, the flap members 31 are closed and no fuel is supplied to the combustion equipment 24. The by-pass air flowing through the by-pass passage 14 is thus wholly supplied to the jet pipe 20.

During take-off, however, fuel is supplied to the combustion equipment 24 and the flap members 31 are opened. The heated by-pass air therefore passes out to atmosphere partly through the nozzles 30 and partly via the jet pipe 20. Thrust is thus augmented during take-off.

I claim:
1. A gas turbine by-pass jet engine comprising compressor means, main combustion equipment, turbine means, a jet pipe, and a main propulsion jet nozzle, all arranged in flow series; a by-pass passage having an upstream end for receiving air compressed by said compressor means, said by-pass passage by-passing the main combustion equipment and the turbine means and communicating at its downstream end with said jet pipe in a permanently fixed opening; by-pass combustion equipment arranged in said py-pass passage upstream of the downstream permanently fixed opening in which the by-pass passage communicates with the jet pipe; a by-pass nozzle mounted at the downstream end of said by-pass passage for discharging heated by-pass air direct to atmosphere in a downstream direction, means for supplying fuel to said by-pass combustion equipment at predetermined periods of operation of the engine, and valve means provided at the downstream end of said by-pass nozzle controlling flow of by-pass air through said nozzle, said valve means being opened when said by-pass combustion equipment is operative to permit flow of heat by-pass air partly directly to atmosphere through said by-pass nozzle and partly to said jet pipe and said valve means being closed when said combustion equipment is inoperative to permit flow of all by-pass air to said jet pipe.

2. A gas turbine by-pass engine as claimed in claim 1 in which said permanently fixed opening of said downstream end of said by-pass passage into said jet pipe includes a plurality of angularly spaced apart apertures.

References Cited

UNITED STATES PATENTS

| | | | |
|---|---|---|---|
| 2,672,726 | 3/1954 | Wolf | 60—226 |
| 2,753,685 | 7/1956 | Mattinson | 60—226 |
| 3,130,543 | 4/1964 | Oldfield | 60—262 |

FOREIGN PATENTS

| | | |
|---|---|---|
| 666,062 | 2/1952 | Great Britain. |
| 851,153 | 10/1960 | Great Britain. |
| 989,279 | 4/1965 | Great Britain. |

MARK M. NEWMAN, Primary Examiner.

D. HART, Assistant Examiner.